UNITED STATES PATENT OFFICE.

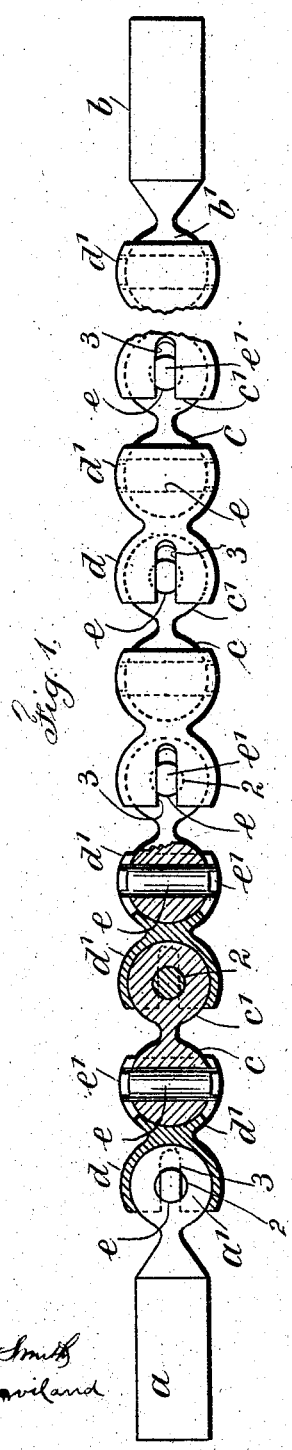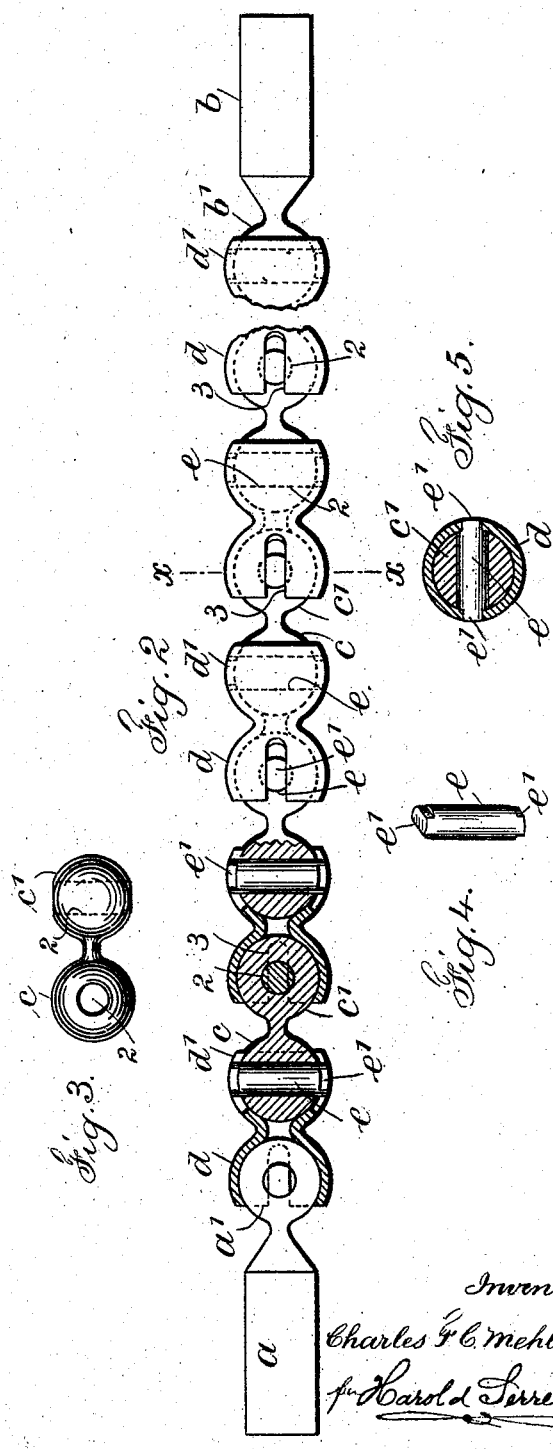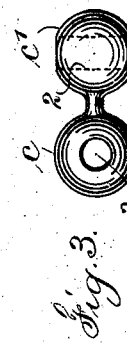

CHARLES F. C. MEHLIG, OF NEW YORK, N. Y.

FLEXIBLE SHAFT.

No. 815,726.　　　Specification of Letters Patent.　　　Patented March 20, 1906.

Application filed May 22, 1905. Serial No. 261,488.

*To all whom it may concern:*

Be it known that I, CHARLES F. C. MEHLIG, a citizen of the United States, residing in the borough of Manhattan, in the city, county, and State of New York, have invented an Improvement in Flexible Shafts, of which the following is a specification.

My invention relates to a flexible shaft adapted for transmitting movement and power from the driving-shaft of a fixed or unitary prime mover to the driven shaft of some mechanical structure or tool in line therewith or at any desired or necessary inclination or angle thereto.

My invention is applicable for general uses in the arts and manufactures, and is especially adapted for use with dental engines and similar appliances or light machinery; and the object of my invention is to produce a flexible shaft especially for such use and compact in form, but one in which there shall be substantially no lost motion or backlash and a maximum amount of freedom of movement in any departure from a straight line and in any angle.

In carrying out my invention and in combination with the ends of the driving and driven shaft having sphere or socket terminations I employ spheres in pairs and sockets in pairs receiving the spheres, the spheres having axial pins and the sockets central opposite slots receiving the ends of the pins. The spheres are free to move in the sockets guided by the ends of the axial pins, and the bearing of the pins in the slots of the sockets provides for the transmission of motion and power from the power-shaft to the driven shaft. The ends of the axial pins are preferably reduced and provided with flat opposite faces adapted to bear against the opposite faces of the slots. I have shown and prefer to place the axial pins of adjacent spheres at right angles to one another, so as to perceptibly increase the flexibilty of the connected parts forming the shaft. The pairs of sockets may be formed from a solid block of metal or from a tube, and the sockets comprise about two hundred and fifty degrees of the circle in order to engage the spheres effectively.

In the drawings, Figures 1 and 2 are elevations and partial sections representing forms of my invention, the same being broken through to indicate indefinite length. Fig. 3 is an elevation of a pair of spheres; Fig. 4, a perspective view of one of the axial pins, and Fig. 5 a transverse section on the dotted line *x x* of Fig. 2.

*a* represents one end of a driving-shaft of a fixed or unitary prime mover of any desired character, and *a'* the sphere at the free end of the shaft *a* and which is preferably integral with the shaft. *b* represents the driven shaft of some mechanical structure or tool; *b'*, the sphere at the free end of the shaft *b* and preferably integral therewith. Between the parts *a a'* and *b b'* I employ spheres in pairs and sockets in pairs, *c c'* representing the spheres of each pair and *d d'* the sockets of each pair, the sockets receiving the spheres and comprising about two hundred and fifty degrees of the circle in order to engage the spheres effectively. Each sphere is made with a central aperture 2, each sphere receiving an axial pin having a body portion *e*, with reduced ends *e'*, the pins fitting the holes 2 in the spheres and being free to turn therein.

The sockets centrally and oppositely are provided with slots 3 from the edge inward, the slots receiving the ends of the pins. These ends *e'* are not only reduced but provided with flat opposite faces, the flat faces constituting substantially the reduction, as the ends of the pins lengthwise are the full width of the pins, so that the opposite flat faces of the pins are adapted to bear against the opposite faces of the slots. This provides a liberal bearing-surface and reduces the wear incident to movement to a minimum, at the same time preventing the pins turning and compelling the spheres to turn on the pins.

I have shown and prefer to place the axial pins of adjacent spheres at right angles to one another. These I have shown in both Figs. 1 and 2 of the drawings, the object thereof being to perceptibly increase the flexibility of the connected parts forming the flexible shaft, it being a fact that a greater flexibility is obtained by placing adjacent pins at right angles to one another or, in other words, alternate pins in like positions, than could possibly be obtained by placing all the pins in like positions. The spheres *c c'* are free to move in the sockets *d d'* and they are guided at the ends of the axial pins in the slots of the socket, and the bearing of the pins in the slots of the sockets provides for the transmission of rotary movement from one shaft to the other and the power of the power-shaft to the driven shaft, compelling the spheres to turn on the axial pins.

In Fig. 1 I have shown the pairs of sockets formed from a solid block of metal turned to external shape and bored out to receive the spheres, and after the spheres are put in place the edges of the sockets are turned in upon the spheres to hold the spheres in place.

In Fig. 2 I have shown the pairs of sockets as formed from a tube of metal, the central portion thereof being rolled in, and after the spheres are put in place the edges of the sockets are turned in upon the spheres to hold the same in position.

The construction shown and described herein for my flexible shaft admits of the same being made of any size, according to the use to which the shaft is to be put, as it is adapted in large sizes for heavy work, as well as in small and light sizes for dental engines and similar light machines.

I claim as my invention—

1. A flexible shaft, consisting of spheres in integral pairs and sockets in integral pairs, the sockets receiving the spheres, axial pins passing through the spheres and engaging the sockets, and shaft-end terminations also connected with the said spheres and sockets.

2. A flexible shaft, consisting of spheres in integral pairs and sockets in integral pairs, the sockets receiving the spheres, axial pins passing through the spheres and having reduced ends with flat opposite faces, the sockets having slots receiving the reduced ends of the axial pins, and shaft-end terminations connected respectively to the spheres and sockets.

3. A flexible shaft, consisting of connected spheres in integral pairs and connected sockets in integral pairs, the sockets receiving the spheres and comprising about two hundred and fifty degrees of the circle in order to effectively engage the spheres, said sockets in pairs being circumferentially and centrally reduced and having slots at opposite sides from their edges inward, axial pins passing through the spheres and having reduced ends received in the slots of the sockets, and shaft-end terminations connected with the spheres and sockets.

4. A flexible shaft, consisting of connected spheres in pairs and connected sockets in pairs, the sockets receiving the spheres and comprising about two hundred and fifty degrees of the circle in order to effectively engage the spheres, said sockets in pairs being circumferentially and centrally reduced and having slots at opposite sides from their edges inward, axial pins passing through the spheres and having reduced ends with flattened faces, said reduced ends being received in the slots of the sockets with their flat faces bearing against the edges of the slots, and shaft-end terminations connecting with the sockets and spheres.

5. A flexible shaft, consisting of connected spheres in pairs and connected sockets in pairs, the sockets receiving the spheres and comprising about two hundred and fifty degrees of the circle in order to effectively engage the spheres, said sockets in pairs being circumferentially and centrally reduced and having slots at opposite sides from their edges inward, axial pins passing through the spheres the pins through adjacent spheres being at right angles to one another, the planes of the slots of the sockets being also at right angles to one another in each pair of sockets, the axial pins having reduced ends passing into the slots of the sockets, and shaft-end terminations connecting with the spheres and sockets.

6. A flexible shaft, consisting of connected spheres in pairs and connected sockets in pairs, the sockets receiving the spheres and comprising about two hundred and fifty degrees of the circle in order to effectively engage the spheres, said sockets in pairs being circumferentially and centrally reduced and having slots at opposite sides from their edges inward, axial pins passing through the spheres the pins through adjacent spheres being at right angles to one another, the planes of the slots of the sockets being also at right angles to one another in each pair of sockets, the axial pins having reduced ends passing into the slots of the sockets, said reduced ends having flat opposite faces bearing against the edges of the slots, and shaft-end terminations connecting with the spheres and sockets.

Signed by me this 19th day of May, 1905.

C. F. C. MEHLIG.

Witnesses:
GEO. T. PINCKNEY,
S. T. HAVILAND.